United States Patent
Chowdhury et al.

(10) Patent No.: US 9,396,484 B2
(45) Date of Patent: Jul. 19, 2016

(54) SYSTEMS AND METHOD FOR DYNAMIC CONTENT INJECTION USING ASPECT ORIENTED MEDIA PROGRAMMING

(75) Inventors: Soudip R. Chowdhury, Birati (IN); Albee Jhoney, Bangalore (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 12/561,217

(22) Filed: Sep. 16, 2009

(65) Prior Publication Data

US 2011/0066614 A1    Mar. 17, 2011

(51) Int. Cl.
   *G06F 7/00*    (2006.01)
   *G06F 17/30*   (2006.01)
   *G06Q 30/02*   (2012.01)
(52) U.S. Cl.
   CPC .................................. *G06Q 30/0251* (2013.01)
(58) Field of Classification Search
   USPC ...................... 707/790, 791, 802, 803, 999.1, 707/999.101; 705/14, 14.4, 14.49; 725/32, 725/34, 35, 36
   See application file for complete search history.

(56) References Cited

U.S. PATENT DOCUMENTS

| | | | |
|---|---|---|---|
| 7,613,691 B2 * | 11/2009 | Finch | |
| 2004/0039796 A1 * | 2/2004 | Watkins | 709/218 |
| 2004/0225564 A1 * | 11/2004 | Walsh et al. | 705/14 |
| 2005/0267813 A1 * | 12/2005 | Monday | 705/26 |
| 2007/0299870 A1 | 12/2007 | Finch | |
| 2008/0201734 A1 | 8/2008 | Lyon et al. | |
| 2008/0276269 A1 | 11/2008 | Miller et al. | |
| 2009/0006191 A1 | 1/2009 | Arankalle et al. | |
| 2009/0089830 A1 * | 4/2009 | Chandratillake et al. | 725/32 |
| 2009/0094637 A1 * | 4/2009 | Lemmons | 725/32 |
| 2009/0138906 A1 * | 5/2009 | Eide et al. | 725/32 |
| 2009/0157472 A1 * | 6/2009 | Burazin et al. | 705/10 |
| 2009/0328113 A1 * | 12/2009 | van de Klashorst | 725/87 |
| 2010/0287580 A1 * | 11/2010 | Harding et al. | 725/14 |

* cited by examiner

*Primary Examiner* — Hares Jami
(74) *Attorney, Agent, or Firm* — Brevetto Law Group

(57) ABSTRACT

A system for injecting business content dynamically based on the context of the user. A media content analysis tool may be used to analyze existing media to identify features and insert tags based on the content and/or time. A media content orchestrator may be used to author scriplets containing product advice for the media stream to insert and associate scriplets to tags in the media stream. The media player, equipped with a codec for the new media format, performs functions such as browsing product information, places orders, or the like.

23 Claims, 5 Drawing Sheets

SYSTEMS AND METHOD FOR DYNAMIC CONTENT INJECTION USING ASPECT ORIENTED MEDIA PROGRAMMING

BACKGROUND

1. Field of the Invention

The present invention relates to managing media content, and more specifically, to systems, methods and computer products for injecting targeted messages into media content.

2. Description of Related Art

As communication and entertainment technologies continue to evolve, we gain increased access to content of various media types an formats. It would sometimes be useful to have the ability to combine different types of media. However, multimedia mixing has been age old problem. Synchronization, media dynamics, and compatible applications are issues that stand in the way of being able to combine content of differing media types. It is possible to statically mix different media types, either at design-time or at delivery-time, using state-of-art technologies and tools. But the ability to dynamically mix different media types has not been sufficiently addressed.

The inventors recognized the need to mix business content with entertainment Content in a context conducive to business transactions.

SUMMARY

Various embodiments of this disclosure overcome the drawbacks of conventional systems and provide the ability to dynamically inject business-content into a media stream based on a current context such as content-context (which segment of the media is being delivered/rendered), time-context (when the media is delivered/rendered) or space-context (where the media is delivered/rendered).

Embodiments disclosed herein address the above stated needs by providing systems, methods and computer products for dynamically obtaining and injecting business-relevant content (such as, advertisement or product advice or training content) into an entertainment content, in a contextual manner, by the content/media-player. Wherein, the context or features in the entertainment content has been annotated upfront using "tags." A tag is associated with a program-script (streamed along with the media), which when triggered (based on user-events or timer-event) will obtain the business-relevant content for injection into the entertainment content.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Various embodiments disclosed herein enable dynamic content injection using aspect oriented media programming. Program-scripts (also referred to at scriplets) are embedded in the media content to dynamically obtain and mixing different media types allows the dynamic integration of business-relevant content (such as, advertisement or product advice or training content) and media-based entertainment content. This, in turn, provides businesses with the ability to leverage business-related content in the media. For example, apparel used by an actor in a popular video can be used as the subject of targeted advertisement/promotion by the promoter of the video. Also, businesses can use the various embodiments to deliver seasonal product advice in the entertainment media. For example, the promoters of the media can dynamically integrate seasonal promotions into the media. Another benefit is the ability to deliver localized product advice in the media. For example, while playing the media at different cities, states or provinces, the locally relevant product advice can be dynamically integrated into the content using one of the various embodiments disclosed herein.

Figure 1:
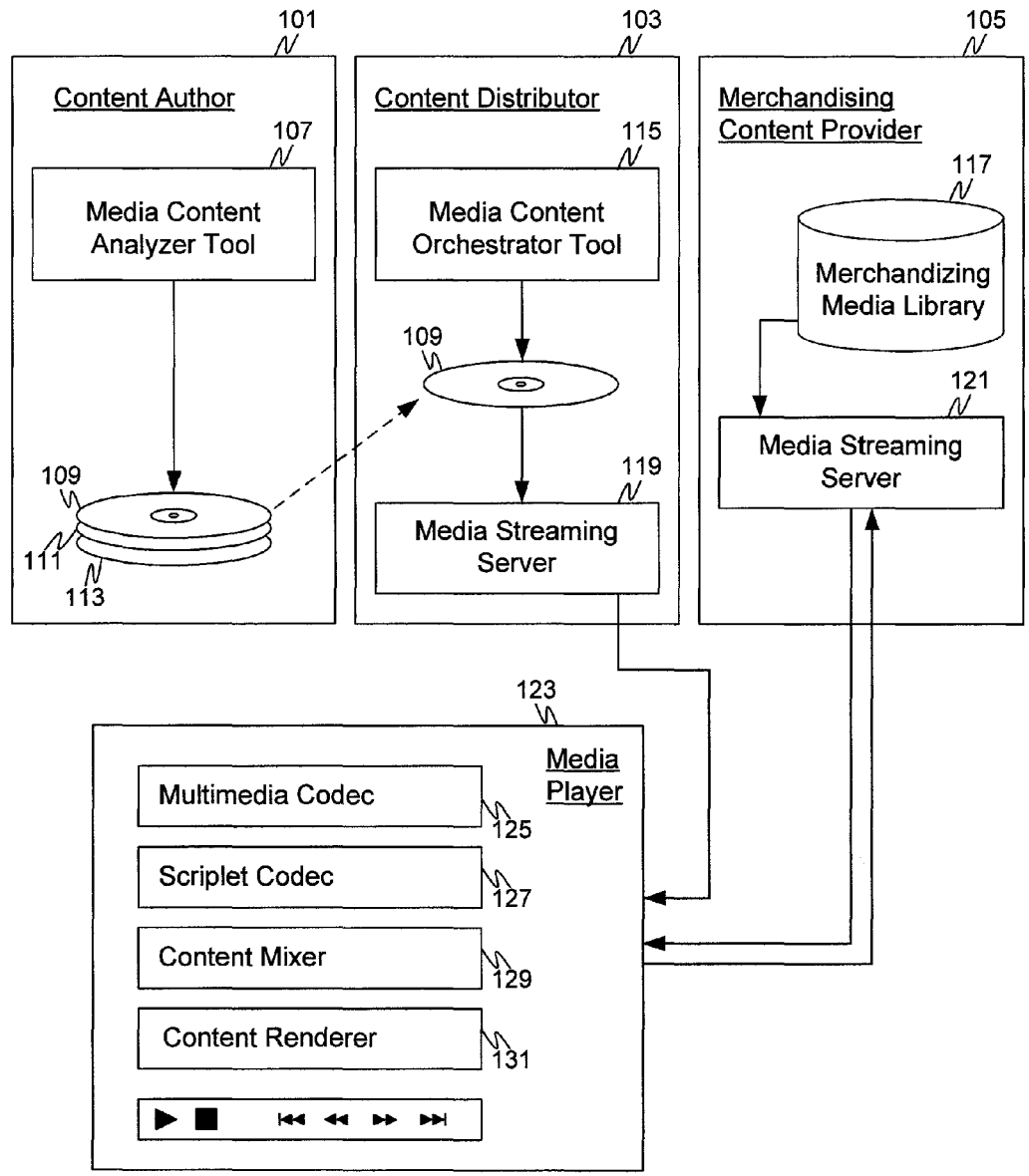
FIG. 1 depicts a system for dynamic content injection using aspect oriented media programming.

FIG. 1 depicts a system for dynamic content injection using aspect oriented media programming. In accordance with various embodiments a media contents analysis tool 107 may be used to analyze existing media 109-113 to identify features and insert tags. Features may be based on the content and/or time. Tags are the join-points in the media. A collection of related tags may be grouped into point-cuts. Join-points are those points that can be used as reference points (due to content importance) and tags are the ways by which join-points are implemented in the digital data. When a new media content has to be generated, multiple join-points can be combined. This process of combining multiple join-points is called point-cuts. A media content orchestrator 115 may be used to author scriplets for the media stream 109 to insert and associate scriplets to tags in the media stream 109. The media player 123 is equipped with codecs 125-127 for the new media format with embedded scriplets. The scriplets can use the media player 123 application programming interfaces (APIs) to perform business functions such as browsing product information, placing orders, or the like. The scriplets can also use the media player 123 to open network connections such as HTTP/RTSP to request additional media content (e.g., to overlay, or mix), or to initiate business transactions based on user inputs.

Dynamic content integration by the media rendering components (e.g., Media content orchestrator tool 115) or media streaming engines 119-121 uses a streaming multimedia format that supports integration of scriplets along with media (audio/video) content. In addition, a codec 127 is needed for the scriplets to control the media, and the behavior of the media player. This may be done by providing well defined application programming interfaces (APIs) to be used by the scriptlets. The APIs control the media-player and provide access to other multimedia content-providers from the codec. The APIs can also dynamically mix the media from the other content providers at the media player. Various embodiments also typically feature one or more content hyperlinks configured to execute scriplets based on user-inputs such as mouse-click. Content overlays and mixing may be used to render UI (user interface) components such as HTML Forms, often configured as translucent overlays over the primary media.

The content overlays dynamically overlay the secondary media content over the primary media.

The content may be delivered to potential customers in a number of different manners. For example, a user may be able to wirelessly connect to the system and view a menu of available content on a playlist. This allows the users to select the content they most want to experience, thus increasing the likelihood that they may be interested in purchasing products (e.g., cosmetics, clothing, shoes or accessories) featured in the content. Another option for delivery is to allow the users to select from among a playlist of different channels, each with a given theme. For example, music video channels may be provided featuring pop hits, hip-hop, jazz, blues, country and western, classic tunes, or the like.

Various embodiments provide a well defined aspect-oriented framework for media integration that serves to define the join-points and point-cuts in an existing media. The framework also defines advises as scriptlets for controlling the media-player and for dynamic content integration. This may be achieved using an aspect-oriented framework/architecture where the dynamic business content can be easily interlaced with the existing entertainment oriented media content. The media content may be delivered in a context deemed most effective for selling the product, e.g., an appropriate space or time context. The time-context is the current time of day, year, season, or the like. The space-context is the physical, logical or geographic location of media content delivery.

Figure 2:
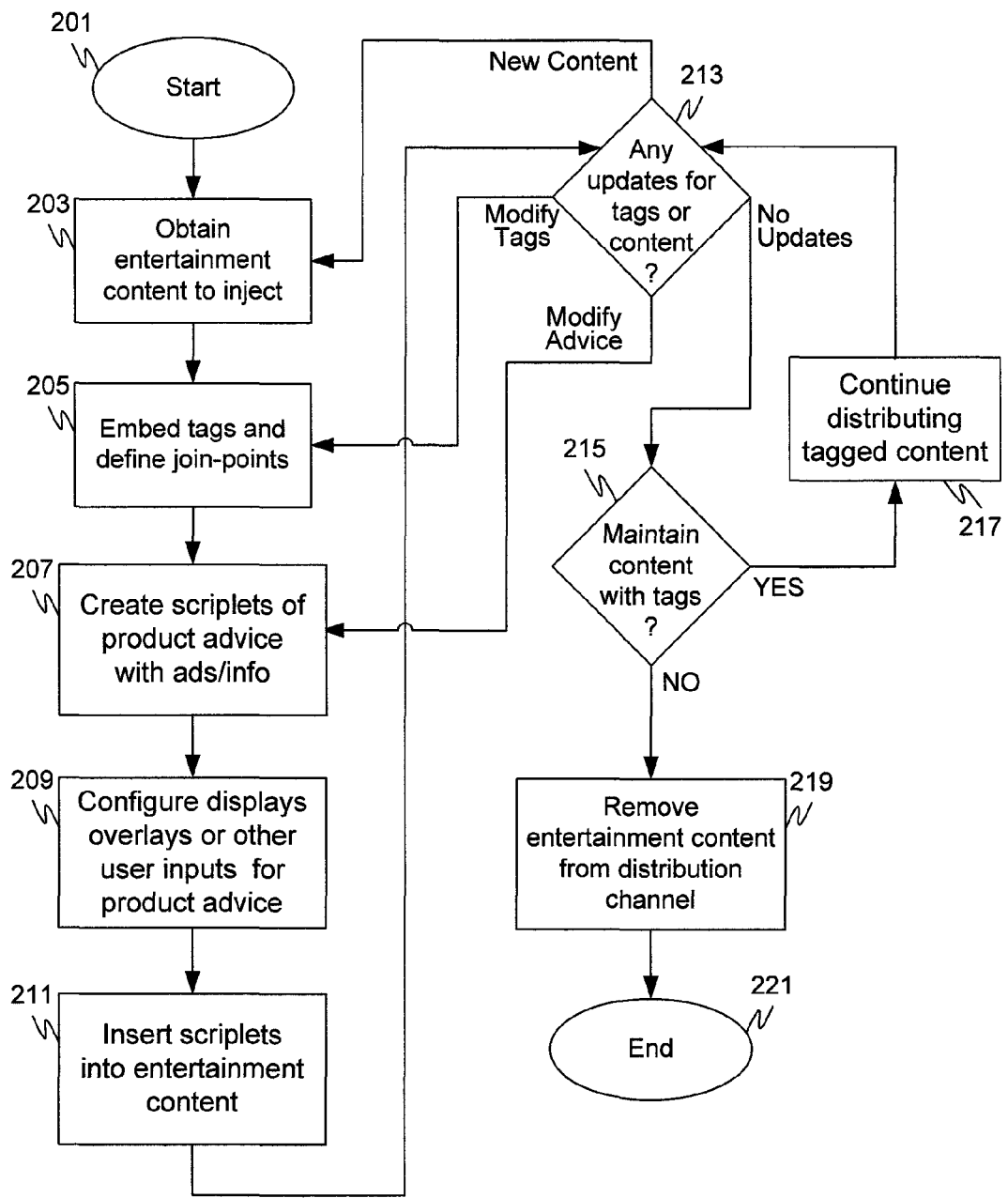
FIG. 2 is a flowchart of activities involved in preparing and maintaining content for the dynamic content injection system according to various embodiments disclosed herein.

FIG. 2 is a flowchart 200 of activities involved in preparing and maintaining content for the dynamic content injection system according to various embodiments disclosed herein. The preliminary activities include steps taken to procure the content to be distributed to potential customers, analyze and tag the content, and perform updates as necessary to reflect changes to the tags or business information (e.g., prices, location or description of the items). The method begins in 201 and proceeds to 203 to obtain entertainment content for the system. The "entertainment content" is content sought after by people (e.g., potential customers) for its entertainment value. The entertainment content used by the system may come in various forms and formats. Typical examples of entertainment content include music videos, songs, short video clips, podcasts and may involve popular music, current news items, comedy sketches, brief reality show segments, or the like. Generally the entertainment content obtained in 203 features people wearing or using the products (or services) to be advertised. In some instances the entertainment content may not include the actual products/services themselves, but instead merely appeals to potential customers who belong to demographic groups deemed likely to purchase those products/services. Part of the activities involved in obtaining entertainment content May involve contracting with the entertainment content owner or manager to pay any necessary copyright fees or royalties. Another activity of block 203 involves securing permission to insert tags into the entertainment content. Upon completing 203 the method proceeds to 205.

In 205 the system embeds tags into the entertainment content and defines join-points. A media content analysis tool may be used to analyze the content obtained in 203 and identify features to be tagged. Tagging the content allows the system to distribute business related product advice along with the entertainment content at the proper time or in the correct context within the entertainment content. Tags as mentioned before are bookmark references in time for a digital media that provides information that a spot is available for dynamic content. They are basically in the form of metadata to be associated with the entertainment content which helps to set the context of the content to be delivered. The Content-Orchestrator basically looks into these tags and create/retrieve the relevant advices/scriptlets which are to be interlaced with the multimedia content at the content provider end. The "product advice" may include an advertisement or information about a product or service for sale, e.g., price or description of the product/service or its location within a store. Tags strategically positioned at key points in the entertainment content tend to enhance the effectiveness of the product advice associated with the tags, thus increasing the likelihood of making a sale. The products to be advertised may be based on the subject matter currently shown in the entertainment content and/or a strategically select time within the entertainment content. For example, the entertainment content may be a music video and the product to be advertised may be a pair of shoes worn by the singer that are clearly visible at the point where the tag is inserted. For a time-based tag, the product may not necessarily be visible within the content at the time the tag is inserted, rather, the tag is inserted at a certain point in time—say, 30 seconds from the end—deemed likely to garner a response from potential clients. Join-points are those points that can be used as a reference points (due to content important) and tags are the ways by which join points are implemented in the digital data. When a new media content has to be generated, multiple join points can be combined. This process of combining multiple join points is called point cuts. The tags are associated with product advice for a product to be advertised at a particular point in the entertainment content. In the present context, the "product" may be either a good or a service. In some instances the entertainment content may come with one or more tags already embedded. In accordance with various embodiments, the system or organization receiving the content may have the option of using some or all of the existing tags, or adding new tags to the entertainment content.

Upon completing 205 to embed tags into the entertainment content the method proceeds to 207. Block 207 involves the creation of scriplets for the product advice. Upon being executed the scriplets will display (or sound) the product advice into or along with the entertainment content. The product advice may include a picture or video clip of the product (the good or service), a description of the product, its price, its location within the store, and any other relevant information that may increase the likelihood of making a sale. The term scriplet is used throughout this disclosure to mean any sort of software, code, routines or other logic suitable for performing the activities associated with the scriplet. The term scriplet does not imply any particular software language or set of formats. Since product advice may change from time to time the scriplets created in block 207 are configured to fetch the recent updates. In this way, if the price for the product changes—say, due to a sale being going into effect—the price or other product advice are fetched from a central server by the scriplet to reflect the sale. Upon completing the product advice scriplets in 207 the method proceeds to 209.

In block 209 scriplets are created or otherwise configured for accessing or displaying the product advice. In some embodiments the product advice may be accessed by providing an overlay with a user-selectable access point, for example, a hyperlink that accepts a mouse click to select it. The user-selectable access point may be positioned near the product it is associated with, as it appears in the entertainment content (if at all), or the user-selectable access point may possibly have an arrow or line drawn to the product. The user-selectable access point may include information itself. For example, the hyperlink button itself may be labeled with information about the product, e.g., "shoes on sale, $79$^{95}$." In other embodiments the product advice may be displayed as a banner ad, a pop-up, or overlay that is seen on top of (or beside) the entertainment content so that the user is not required to take an action (e.g., mouse click on a button) to see the information. In some embodiments there may be one scriplet with the product advice (block 207) and another scriplet controlling the way it is seen or accessed (block 209). In other embodiments the same scriplet may be used for both the product advice and to control its display/access. Upon completing 209 to configure the product advice display overlays or user input access points the method proceeds to 211.

In block 211 the scriplets are inserted into the media content. If the media content is streaming media then the scriplets are inserted into an appropriate juncture so as to be available on screen at the appropriate time, e.g., when the associated product is shown or where the tags are positioned. In some embodiments the media player may be configured to load the product scriplets ahead of when they are needed, saving them until the access point or ad is to appear on screen. In other embodiments the scriplets may be inserted into the entertainment content stream at a point near (often slightly before) the point where they are to be active. Once the scriplets are inserted in 211 the method proceeds to 213.

Block 213 monitors for updates to the product advice, tags or other aspects of the content. For example, if a store runs a special promotional sale the price of the product may be reduced, or its position within the store changed, or the product advice may need to be reworded for the promotion. If there is new product advice to display, there are any changes to the current product advice (or to the format in which it is displayed), or product advices is to be deleted, the method proceeds from 213 along the "Modify Advice" path to 207 to make the desired changes to the existing product advice, or to create a new product advice scriplet. However, if it is determined in 213 that there is a modification to a tag, or a tag is to be eliminated or added, the method proceeds from 213 along the "Modify Tags" path to modify an existing tag (e.g., change its position) or to add/delete/modify a tag. If block 213 determines that there are no changes then the method proceeds from 213 along the "No Updates" path to 215.

In block 215 the method determines whether or not the system is to continue distributing the entertainment content with its tags and product advice. If it is determined in 215 that the entertainment content is to be maintained (e.g., continue airing the streaming video) the method proceeds from 215 along the "YES" path to 217. However, if it is determined that the system is to no longer to continue distributing the entertainment content the method proceeds from 215 along the "NO" branch to 219. In block 219 the content is removed from the distribution channel. This may entail, for example, the entertainment content being deleted from the playlist or removed from a rotation of songs being played periodically. Once the content has been removed the method proceeds to 221 and ends.

Figure 3:
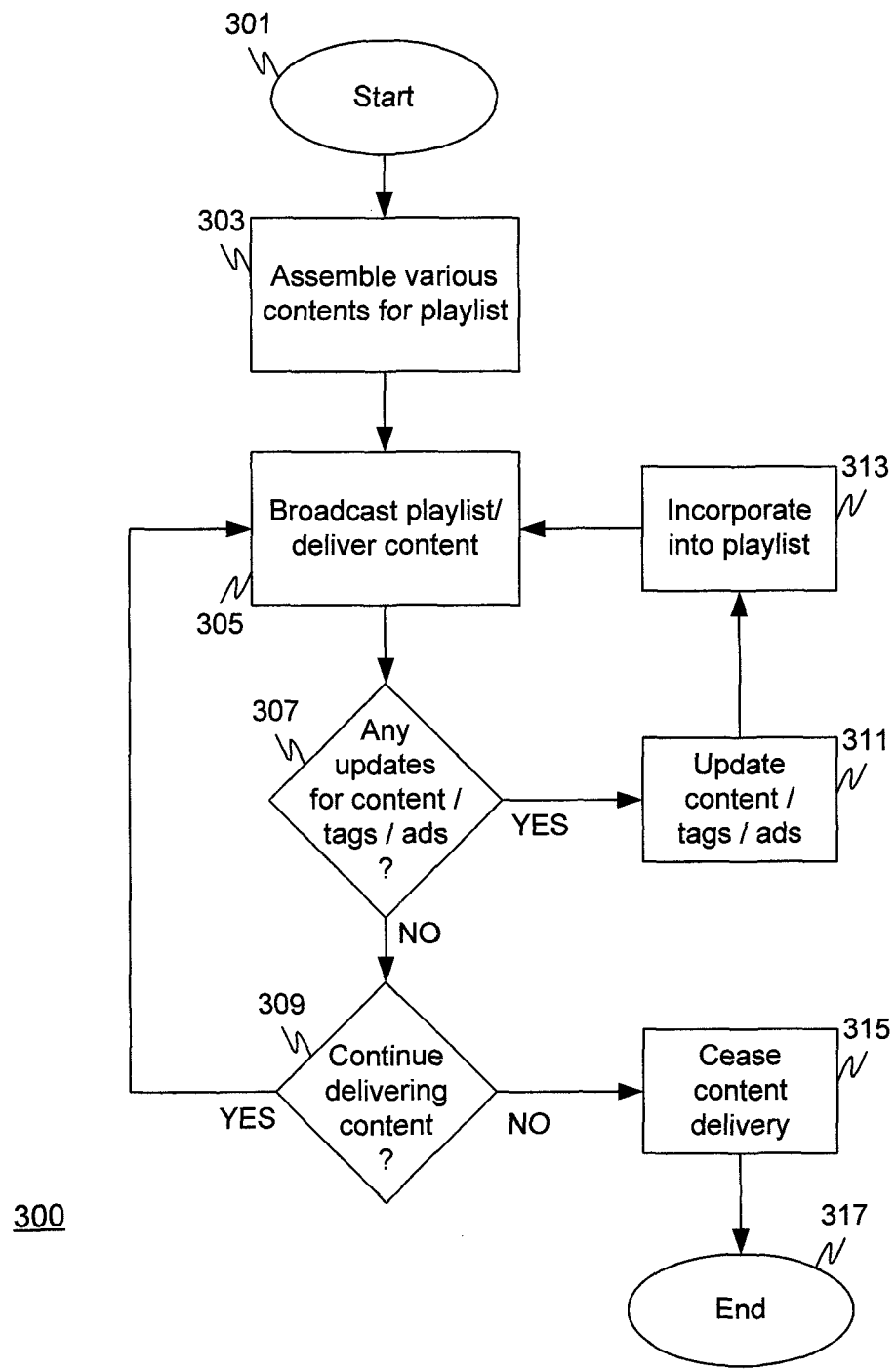
FIG. 3 is a flowchart for a method delivering content according to various embodiments disclosed herein.

FIG. 3 is a flowchart for a method delivering content according to various embodiments disclosed herein. The method begins at 301 and proceeds to 303 to assemble content to be included in a playlist made available to users, e.g., potential customers. The format for providing content may vary, depending upon the particular implementation. For example, the system may provide several different channels, each channel with its own theme or genre, e.g., pop hits, hip-hop, jazz, blues, country and western, classic tunes, or the like. The various content items may also be provided in a list from which the users may choose individual titles. The list—a playlist—may also be organized by theme or genre, by artist alphabetically, or any combination of these. The process of assembling the content in 303 involves the activities described previously in conjunction with FIG. 2 to obtain, tag and create scriplets for the content. Upon completing 303 to assemble the content for the system's playlist the method proceeds to 305.

In block 305 the system delivers the entertainment content to potential customers. An example of this can be seen in FIG. 4 which depicts a store 401 with a dynamic content injection system. In some embodiments the system delivers entertainment content by wirelessly streaming it from a broadcast device. In some embodiments the broadcast device is located within the store (e.g., broadcast device 403 located within store 401 of FIG. 4). In other embodiments the broadcasting of entertainment content may be performed from outside of the store. For example, a cellular telephone provider may provide the service to their cellular telephone subscribers. However, In such embodiments the services (e.g., tags with product advice) would be of little use to subscribers not in the vicinity of the store. Therefore, if the broadcasting takes place remotely—that is, from outside the store—then an access means is used to limit access to the entertainment content to those users (potential customers) who are within the store. The access means may be a special code given out in the store needed to receive the remote broadcast, or the access means may be a detection system that detects whether the user is within the store (e.g., cellular signal power level triangulation), or other like system for limiting access to users within the store. Once the system is broadcasting the entertainment content the method proceeds to 307.

In block 307 it is determined whether there are any updates for entertainment content, tags or product advice. If there are updates the method proceeds from 307 along the "YES" path to 311 to make the appropriate update. Upon completing the update or modification in 311 (which may include adding new entertainment content, tags or product advice), the method proceeds to 313 to incorporate the updated content into the playlist. The method then loops back to block 305. Back in 307, if it is determined that no updates are needed the method proceeds from 307 along the "NO" path to 309.

Block 309 determines whether to continue delivering content. If content delivery is to continue, as determined in block 309, the method proceeds from 309 along the "YES" path back to 305 to continue broadcasting or otherwise delivering the content. However, if it is determined in 309 to discontinue content delivery to the users the method proceeds from 309 along the "NO" path to 315. In block 315 the system ceases delivery of the content. The method then proceeds to 317 and ends.

Figure 4:
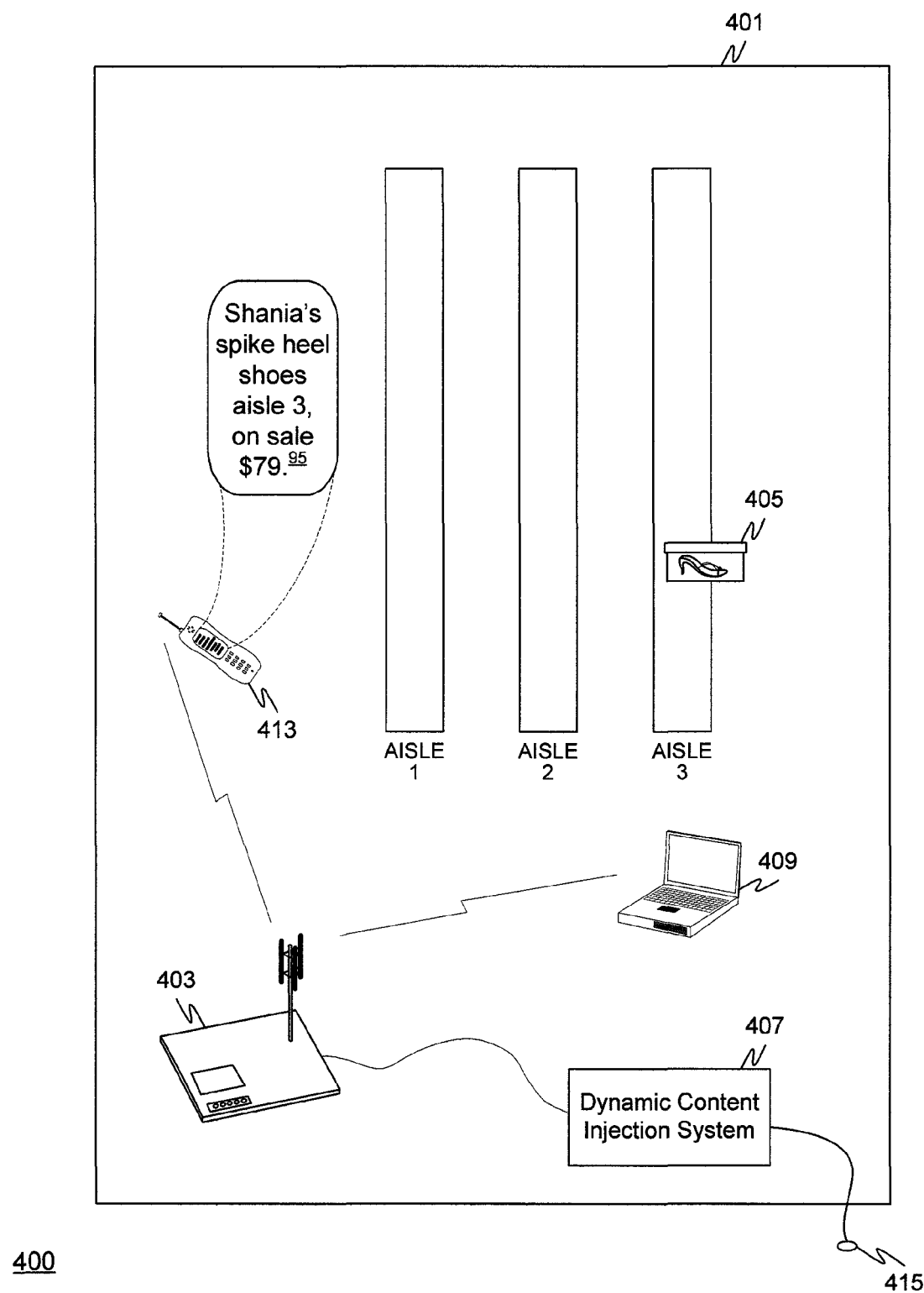
FIG. 4 depicts a store with a dynamic content injection system in accordance with various embodiments disclosed herein.

FIG. 4 depicts a store with a dynamic content injection system in accordance with various embodiments disclosed herein. The system is implemented within a store 401. The "store," as this term is used herein, is a business established for the purpose of selling (or renting) goods or services. In various embodiments the store is located within a building. The building may house one store by itself (e.g., a stand-alone store) or my house many stores (e.g., a shopping mall). In some embodiments a store may include the property outside the building which houses the store and adjacent to the building (and also generally owned and/or controlled by the owners of the store), e.g., an automobile dealership's outdoor car lot adjacent the showroom building. In the example depicted in FIG. 4 the store 401 sells products, including shoes, arranged in aisles 1-3. Product is located on aisle 3.

The store 401 has located within it a dynamic content injection system 407, various features of which are described in the paragraphs above. The system 407 is connected to a broadcast device 403 which is also located within the store 401. Various embodiments may use different types of broadcast devices, including for example, cellular telephone broadcast devices, wireless computer nodes, infrared broadcast devices, or other like types of communication devices capable of sending signals with information or data. For example, the broadcast device 403 may be digital or analog, and may be implemented using various encoding schemes or transmission technologies e.g., wi-fi, FDMA, TDMA, CDMA, GSM, IP telephony through wi-fi, or a hybrid or these or other like schemes. The broadcast device 403 is connected to dynamic content injection system 407, typically implemented in a computer such as that depicted in FIG. 5. The system 407 may be connected to an outside communication system, network or other source of data 415 such as the Internet, PSTN, cable television system, or other such communication system.

In the example of FIG. 4 the broadcast device 403 sends signals containing the entertainment content to smartphone 413. In some embodiments users may receive the signals on computers such as laptop computer 409. The following example about Alice, a typical consumer, highlights the relevance of an aspect oriented media programming framework in today's world. Alice, like many young people of today, enjoys listening to pop songs. Alice is also an avid shopper, visiting store 401 almost every day. The store 401 where Alice shops has its own in-house entertainment system 407 where the shoppers can subscribe to and view/listen to the latest music and video for free using their mobile-phone. Alice subscribed to the songs of Shania Twain, her favorite artist. In her latest song Shania wore new accessories and new clothing style, all of which store 401 has picked up for seasonal promotion.

The store 401 uses an embodiment disclosed herein to promote the new clothing range and accessories by interlacing Shania's video and songs with the related merchandizing content the location of those products in the mall, and possibly other related promotional contents as well. Doing this should help store 401 reach its sales goals. Upon seeing the video, Alice becomes interested in purchasing the clothing style worn by Shania. The interlaced in-video merchandizing content helps Alice to locate Shania's style of clothing and accessories within store 401—in this example, Shania's shoes 405 located on aisle 3.

In this example, store 401 was able to provide this functionality by leveraging the pre-defined "tags" (or join-points) in Shania's video. Store 401 uses a studio (or a tool) to program the video with appropriate "advice" (or scriplets), for these join-points. In some embodiments these product advices are executed by a specialty designed codec (e.g., codec 127 of FIG. 1) of the media-player in response to the media player encountering the tag in the video. In other embodiments the product advices is formatted within the content in such a way that it can be decoded by a standard codec suitable for viewing (or listening to) the entertainment content. This new format of promotion with the streaming media helps merchants to sell predefined items faster by providing an entertaining experience to the customers.

Figure 5:
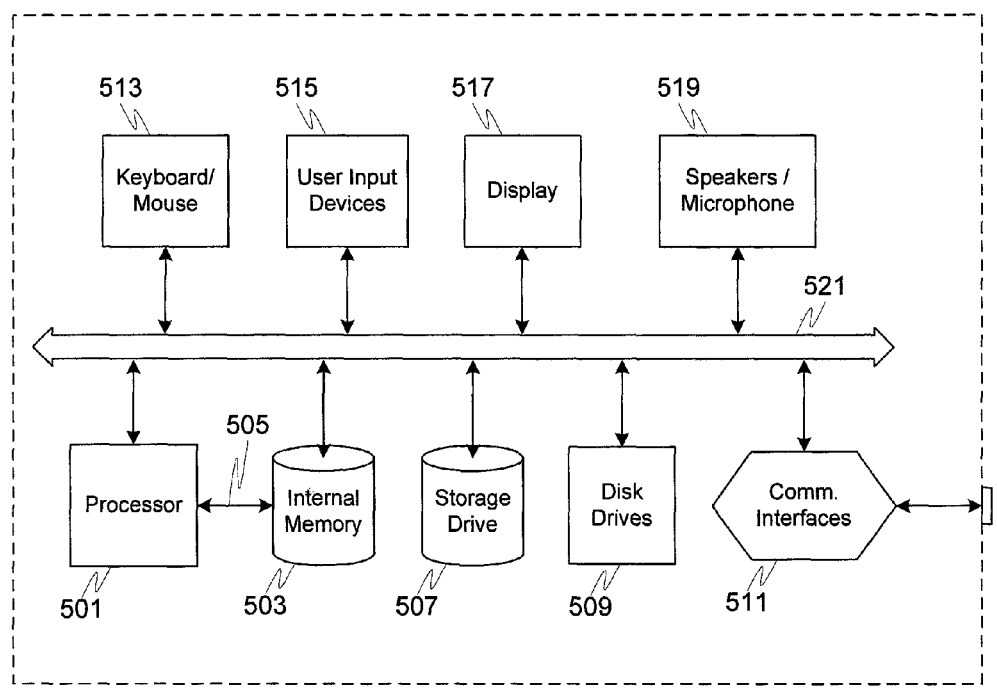
FIG. 5 depicts a computer system suitable for implementing and practicing various embodiments.

FIG. 5 depicts a computer system suitable for implementing and practicing various embodiments. The computer system 500 may be configured in the form of a desktop computer, a laptop computer, a mainframe computer, or any other arrangement capable of being programmed or configured to carry out instructions. The computer system 500 may be located and interconnected in one location, or may be distributed in various locations and interconnected via communication links such as a local or wide area network (LAN or WAN), via the Internet, via the public switched telephone network (PSTN), or other such communication links. Other devices may also be suitable for implementing or practicing the embodiments, or a portion of the embodiments. Such devices include personal digital assistants (PDA), wireless handsets (e.g., a cellular telephone or pager), and other such consumer electronic devices preferably capable of being programmed to carry out instructions or routines.

Computer system 500 includes a processor 501 which may be embodied as a microprocessor, two or more parallel processors, central processing unit (CPU) or other such control logic or circuitry. The processor 501 is configured to access an internal memory 503, generally via a bus such as the system bus 521. The internal memory 503 may include one or more of random access memory (RAM), read-only memory (ROM), cache memory, or a combination of these or other like types of circuitry configured to store information in a retrievable format. In some implementations the internal memory 503 may be configured as part of the processor 501, or alternatively, may be configured separate from it but within the same packaging. The processor 511 may be able to access internal memory 503 via a different bus or control lines (e.g., local bus 505) than is used to access the other components of computer system 500.

The computer system 500 also includes, or has access to, one or more storage drives 507 (or other types of storage memory) and floppy disk drives 509. Storage drives 507 and the floppy disks for floppy disk drives 509 are examples of machine readable (also called computer readable) mediums suitable for storing the final or interim results of the various embodiments. The floppy disk drives 509 may include a combination of several disc drives of various formats that can read and/or write to removable storage media (e.g., CD-R, CD-RW, DVD, DVR, floppy disk, or the like). The computer system 500 may either include the storage drives 507 and floppy disk drives 509 as part of its architecture (e.g., within the same cabinet or enclosure and/or using the same power supply), as connected peripherals, or may access the storage drives 507 and floppy disk drives 509 over a network, or a combination of these. The storage drive 507 is often a hard disk drive configured for the storage and retrieval of data, computer programs or other information. The storage drive 507 need not necessarily be contained within the computer system 500. For example, in some embodiments the storage drive 507 may be server storage space within a network that is accessible to the computer system 500 for the storage and retrieval of data, computer programs or other information. In some instances the computer system 500 may use storage space at a server storage farm, or like type of storage facility, that is accessible by the Internet 550 or other communications lines. The storage drive 507 is often used to store the software, instructions and programs executed by the computer system 500, including for example, all or parts of the computer application program for carrying out activities of the various embodiments of the invention.

The computer system 500 may include communication interfaces 511 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The computers system 500 may be connected to the Internet via the wireless router 501, or a wired router or other such access node (not show). The components of computer system 500 may be interconnected by a bus 521 and/or may include expansion slots conforming to any of various industry standards such as PCI (Peripheral Component Interconnect), ISA (Industry Standard Architecture), or EISA (enhanced ISA).

Typically, the computer system 500 includes one or more user input/output devices such as a keyboard and/or mouse 513, or other means of controlling the cursor represented by the user input devices 515 (e.g., touchscreen, touchpad, joystick, trackball, etc.). The communication interfaces 511, keyboard and mouse 513 and user input devices 515 may be used in various combinations, or separately, as means for receiving information and other inputs to be used in carrying out various programs and calculations. A display 517 is also generally included as part of the computer system 500. The display may be any of several types of displays, including a liquid crystal display (LCD), a cathode ray tube (CRT) monitor, a thin film transistor (TFT) array, or other type of display suitable for displaying information for the user. The display 517 may include one or more light emitting diode (LED) indicator lights, or other such display devices. In addition, most computer systems 500 also include, or are connected to, one or more speakers and microphones 519 for audio output and input. Speech recognition software may be used in conjunction with the microphones 519 to receive and interpret user speech commands.

Various activities may be included or excluded as described above, or performed in a different order, while still remaining within the scope of at least one of the various embodiments. For example, block 219 describes the development of access and transmission means for users to access the entertainment content delivery system. The activities of this block can take place in any of several different junctures, for example, before any of blocks 203-213. Another activity that can take place in a different order than depicted in the figures is block 209 which entails configuring the overlays and user inputs for accessing the scriplets. The activities of block 209 may be performed each time a new item of entertainment content is obtained, for example, as part of block 311 of FIG. 3. Other steps or activities of the methods disclosed herein may be omitted or performed in a different manner while remaining within the intended scope of the invention. The method may be implemented through the addition and manipulation of circuitry to a design, hence is applicable for analysis using logic evaluation frameworks such as logic simulators or formal verification algorithms, as well as hardware-based frameworks such as hardware emulators/accelerators and even fabricated chips.

The invention may be implemented with any sort of processing units, processors and controllers (e.g., processor 501 of FIG. 5) capable of performing the stated functions and activities. For example, the processor 501 may be embodied as a microprocessor, microcontroller, DSP, RISC processor, two or more parallel processors, or any other type of processing unit that one of ordinary skill would recognize as being capable of performing or controlling the functions and activities described herein. A processing unit in accordance with at least one of the various embodiments can operate computer software programs stored (embodied) on computer-readable medium such those compatible with the disk drives 509, the storage drive 507 or any other type of hard disk drive, CD, flash memory, ram, or other computer readable medium as recognized by those of ordinary skill in the art.

The computer software programs can aid or perform the steps and activities described above. For example computer programs in accordance with at least one of the various embodiments may include: source code for obtaining a content based tag; source code for inserting the tag into entertainment content at a point associated with a product featured in the entertainment content; source code for associating the tag with product advice about the product with the tag being configured to point to the product advice logic; source code for inserting the product advice logic into the entertainment content at a point configured to make it available upon reaching the tag as the entertainment content is played; and source code for distributing the entertainment content from within a store to a smartphone device also located within the store. There are many further source codes that may be written to perform the various steps, activities and procedures disclosed above that are intended to lie within the scope of the various embodiments. Various activities may be included or excluded as described above, or performed in a different order, with the rest of the activities still remaining within the scope of at least one exemplary embodiment.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method of product advice injection into entertainment content the method comprising:
    inserting a content based tag into the entertainment content at a point associated with a product featured in the entertainment content;
    associating said tag with product advice logic containing product advice about the product, said tag being configured to point to the product advice logic;
    inserting said product advice logic into the entertainment content at a point configured to make said product advice logic available upon reaching the tag in said entertainment content; and
    storing said product advice logic and the entertainment content within machine readable storage media before distributing the entertainment content to a portable communication device;
    distributing, from within a store, the entertainment content to the portable communication device located within the store, wherein said product is sold in the store;
    wherein said product advice logic is configured to display product advice on a display screen of said portable communication device in response to said portable communication device reaching said tag at the point in the entertainment content associated with the product;
    displaying a user-selectable access point comprising information about the product;
    detecting a user input selecting said access point;
    wherein said product advice logic is configured to display the product advice on the display screen of said portable communication device in response to said portable communication device reaching said tag at the point in the entertainment content associated with the product and detecting said user input selecting said access point; and
    wherein the user-selectable access point is a hyperlink with a label displaying a name and price of the product.

2. The method of claim 1, wherein said product advice includes advice about a location that the product is being sold within the store; and
    wherein said tag comprises metadata associated with the entertainment content at said point.

3. The method of claim 2, wherein said distributing comprises:
    broadcasting the entertainment content from broadcast means located within the store.

4. The method of claim 3, wherein said portable communication device is a smartphone and broadcast means transmits signals wirelessly from within said store to the smartphone also located in said store.

5. The method of claim 1, wherein the product advice logic is a product advice scriplet.

6. The method of claim 1, wherein the method further comprises:
producing said tag either through automatic content detection or explicit content tagging.

7. The method of claim 1, wherein the entertainment content is a video featuring a performer, and the product featured in the entertainment content is clothing worn by the performer in said video.

8. The method of claim 1, wherein the inserting of said product advice logic is performed by a content provider and further comprises:
interlacing said product advice logic with the entertainment content.

9. The method of claim 1, wherein the distributing of the entertainment content comprises broadcasting the entertainment content within the store.

10. A software product comprising a program of instructions stored on a non-transitory computer readable device for product advice injection into entertainment content wherein the program of instructions upon being executed on a computer causes the computer to perform activities comprising:
inserting a content based tag into the entertainment content at a point associated with a product featured in the entertainment content;
associating said tag with product advice logic containing product advice about the product, said tag being configured to point to the product advice logic;
inserting said product advice logic into the entertainment content at a point configured to make said product advice logic available upon reaching the tag in said entertainment content;
storing said product advice logic and the entertainment content within machine readable storage media before distributing the entertainment content to a portable communication device;
distributing, from within a store, the entertainment content to the portable communication device located within the store, wherein said product is sold in the store; and
wherein said product advice logic is configured to display product advice on a display screen of said portable communication device in response to said portable communication device reaching said tag at the point in the entertainment content associated with the product;
displaying a user-selectable access point comprising information about the product;
detecting a user input selecting said access point;
wherein said product advice logic is configured to display the product advice on the display screen of said portable communication device in response to said portable communication device reaching said tag at the point in the entertainment content associated with the product and detecting said user input selecting said access point; and
wherein the user-selectable access point is a hyperlink with a label displaying a name and price of the product.

11. The software product of claim 10, wherein said product advice includes advice about a location that the product is being sold within the store; and
wherein said tag comprises metadata associated with the entertainment content at said point.

12. The software product of claim 11, wherein said distributing comprises:
broadcasting the entertainment content from broadcast means located within the store.

13. The software product of claim 12, wherein said portable communication device is a smartphone and broadcast means transmits signals wirelessly from within said store to the smartphone also located in said store.

14. The software product of claim 10, wherein the product advice logic is a product advice scriplet.

15. The software product of claim 10, further comprising:
producing said tag either through automatic content detection or explicit content tagging.

16. The software product of claim 10, wherein the entertainment content is a video featuring a performer, and the product featured in the entertainment content is clothing worn by the performer in said video.

17. The software product of claim 10, wherein the inserting of said product advice logic is performed by a content provider, and said activities further comprise:
interlacing said product advice logic with the entertainment content.

18. The software product of claim 10, wherein the distributing of the entertainment content comprises broadcasting the entertainment content within the store.

19. A system for product advice injection into entertainment content, the system comprising:
memory configured to store the entertainment content which includes a content based tag at a point associated with a product featured in the entertainment content;
a processor configured to insert product advice logic into the entertainment content at a point configured to make said product advice logic available upon reaching the tag in said entertainment content, said tag being configured to point to product advice logic;
a first display screen associated with said processor and being configured to display product advice for the product, said product advice being associated with the product advice logic; and
a broadcast device configured to distribute, from within a store, the entertainment content to a portable communication device located within the store;
wherein said product advice logic is configured to display the product advice on a second display screen of said portable communication device in response to said portable communication device reaching said tag at the point in the entertainment content associated with the product; and
wherein said memory is a machine readable storage media, and said product advice logic and the entertainment content is stored within the machine readable storage media before distributing the entertainment content to said portable communication device;
wherein the first display screen is further configured to displaying a user-selectable access point comprising information about the product;
means for detecting a user input selecting said access point;
wherein said product advice logic is configured to display the product advice on the display screen of said portable communication device in response to said portable communication device reaching said tag at the point in the entertainment content associated with the product and detecting said user input selecting said access point; and
wherein the user-selectable access point is a hyperlink with a label displaying a name and price of the product.

20. The system of claim 19, wherein said product advice includes advice about a location that the product is being sold within the store; and wherein said tag comprises metadata associated with the entertainment content at said point.

21. The system of claim 19, wherein said portable communication device is a smartphone and the broadcast device transmits signals wirelessly from within said store to the smartphone also located in said store.

22. The system of claim 19, wherein the inserting of said product advice logic is performed by a content provider, said processor further being configured to:
   interlace said product advice logic with the entertainment content.

23. The system of claim 19, wherein said memory is a machine readable storage media.

* * * * *